United States Patent [19]
Mendoza

[11] Patent Number: 6,102,214
[45] Date of Patent: *Aug. 15, 2000

[54] CABLE MANAGEMENT RACK FOR TELECOMMUNICATIONS EQUIPMENT

[75] Inventor: Jose-Filonel Tawag Mendoza, Brooklyn Center, Minn.

[73] Assignee: ADC Telecommunications, Inc., Minnetonka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/249,718

[22] Filed: Feb. 12, 1999

[51] Int. Cl.[7] ...................................................... A47F 5/00
[52] U.S. Cl. .............................. 211/26; 361/826; 361/829
[58] Field of Search ...................... 211/26, 189; 361/826, 361/827, 829; 312/265.4

[56] References Cited

U.S. PATENT DOCUMENTS

| | | |
|---|---|---|
| 2,896,009 | 7/1959 | Caveney . |
| 4,665,546 | 5/1987 | Brey et al. . |
| 5,326,934 | 7/1994 | LeMaster et al. .................. 361/827 X |
| 5,586,012 | 12/1996 | Lerman .................................. 211/26 X |
| 5,683,001 | 11/1997 | Masuda et al. ............................ 211/26 |
| 5,765,698 | 6/1998 | Bullivant .................................... 211/26 |
| 5,788,087 | 8/1998 | Orlando .................................... 211/26 |
| 5,819,956 | 10/1998 | Rinderer .................................... 211/26 |
| 5,867,372 | 2/1999 | Shie ....................................... 361/826 |
| 5,921,402 | 7/1999 | Magenheimer ............................ 211/26 |

*Primary Examiner*—Robert W. Gibson, Jr.
*Attorney, Agent, or Firm*—Merchant & Gould P.C.

[57] ABSTRACT

The present disclosure relates to a rack for mounting telecommunication chassis each adapted for receiving cross-connect modules. The rack includes a frame defining a bay formed between two spaced-apart, vertical end walls. The bay is sized for receiving the telecommunication chassis. The rack also includes a cable management structure connected to the frame. The cable management structure defines first and second separate vertical channels. The first vertical channel defines a first passage area sized for receiving a plurality of cross-connect cables from the telecommunication chassis. The second vertical channel defines a second passage area sized for receiving power and ground wires from the telecommunication chassis.

35 Claims, 8 Drawing Sheets

CABLE MANAGEMENT RACK FOR TELECOMMUNICATIONS EQUIPMENT

FIELD OF THE INVENTION

The present invention relates generally to the field of telecommunications equipment. More particularly, the present invention relates to high density frames, bays or racks for providing cross-connections between telecommunication circuits.

BACKGROUND OF THE INVENTION

A digital cross connect system (DSX) provides a location for interconnecting two digital transmission paths. The apparatus for a DSX is located in one or more frames, racks or bays, usually in a telephone central office. The DSX apparatus also provides jack access to the transmission paths.

DSX jacks are well known and typically include a plurality of bores sized for receiving co-axial or tip-and-ring plugs. In the case of co-axial plugs, the bores are provided with center conductors and co-axial grounds. In the case of tip-and-ring plugs, a plurality of spring contacts are provided within the bores for contacting the tip-and-ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

The number of jacks or cross-connect points that are located at a bay of a given size is referred to as the density of a bay. As the cross-connect density increases, the management of telecommunication wires in the bay becomes increasingly complex. For high density DSX bays, wire management is critical.

SUMMARY OF THE INVENTION

One aspect of the present invention relates to a rack for mounting telecommunication chassis each adapted for receiving cross-connect modules or jacks. The rack includes a frame defining a bay formed between two spaced-apart, vertical end walls. The bay is sized for receiving the telecommunication chassis. The rack also includes a cable management structure connected to the frame. The cable management structure defines first and second separate vertical channels. The first vertical channel defines a first passage area sized for receiving a plurality of cross-connect cables from the chassis. The second vertical channel defines a second passage area sized for receiving power and ground wires from the chassis. The second passage area is substantially smaller than the first passage area.

Another aspect of the present invention relates to a ring structure for use with telecommunications equipment. The ring structure includes a base adapted for connection to a telecommunication cross-connect rack. The ring structure also includes a first ring that projects outward from the base plate and at least partially defines a first opening sized for receiving a plurality of cross-connect cables. The ring structure further includes a second ring that projects outward from the base plate and at least partially defines a second opening sized for receiving power and ground wires. The second opening is separate from the first opening.

A further aspect of the present invention relates to a rack for mounting telecommunication chassis each adapted for receiving cross-connect modules. The rack includes a frame having a front and a back. The frame defines a bay formed between two spaced-apart, vertical end walls. The bay is sized for receiving the telecommunication chassis. The rack also includes a plurality of rings mounted at the back of the frame for receiving cross-connect cables from the cross-connect modules. The rack further includes a plurality of vertically spaced-apart junction plates projecting transversely outward from the vertical end walls adjacent the front of the frame. The junction plates are arranged and configured for connecting the frame to an adjacent frame. A plurality of slot regions are positioned between the vertically spaced-apart junction plates. The slot regions are sized for allowing front access to input/output cables positioned between adjacent frames.

An additional aspect of the present invention relates to a rack for mounting telecommunication chassis each adapted for receiving cross-connect modules. The rack is adapted to be supported on a raised floor with cut-out power cable openings for passing power cables through the floor, and cut-out input/output openings for passing input/output cables through the floor. The rack includes a frame having a top and a base. The base includes a base plate defining a power cable opening adapted to align with the cut-out power cable opening of the raised floor. The frame defines a bay formed between two spaced-apart, vertical end walls. The bay is sized for receiving the telecommunication chassis. The rack also includes outwardly facing channels that extend along the vertical end walls. The outwardly facing channels are arranged and configured for receiving input/output cables from the cross-connect modules. The outwardly facing channels are adapted to generally align with the cut-out input/output openings of the raised floor. At least one of the vertical end walls of the frame defines a cable clearance opening located at the base of the frame for allowing input/output cables extending along the at least one vertical end wall to pass directly beneath the frame. The clearance opening provides clearance for allowing the input/output cables to curve around an obstruction partially blocking the cut-out input/output opening in the floor.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
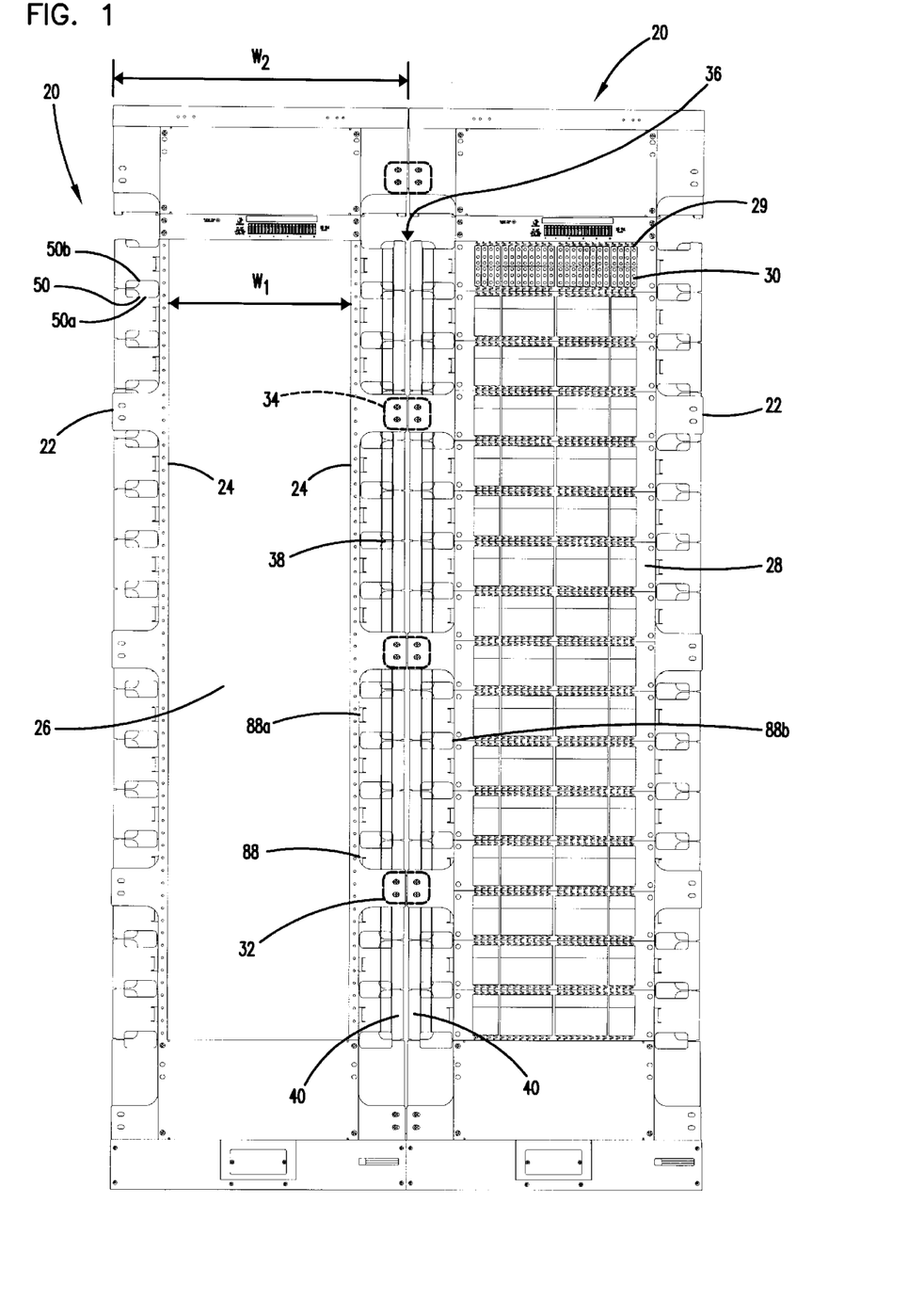
FIG. 1 is a front view of two interconnected racks constructed in accordance with the principles of the present invention.

FIG. 1 shows a front view of two racks 20 constructed in accordance with the principles of the present invention. Each rack 20 includes a frame 22 having two spaced-apart, vertical end walls 24. Each set of vertical end walls 24 defines a bay 26 sized for receiving conventional telecommunication chassis 28 (for clarity, the chassis 28 are shown in only the right-most rack 20). The chassis 28 are each adapted for holding conventional cross-connect modules 30 (only shown in one of the chassis 28) which can be permanently or removably mounted within the chassis 28. The embodiment shown in FIG. 1 is a rear cross-connect system. The modules 30 define front ports 29. By inserting patch plugs within the ports 29, signals transmitted through the modules 30 can be interrupted or monitored. At the back of the racks 20, the modules 30 provide cross-connection locations, input connection locations, output connection locations, power connection locations, and ground connection locations.

In use, input/output cables are connected to the input/output connection locations, cross-connect cables are connected to the cross-connect locations, and ground and power wires are connected to the ground and power contact locations. As will be described later in the specification, the racks 20 are configured to provide for effective cable management of the various cables and wires that interface with the modules 30 mounted on the racks 20.

Referring still to FIG. 1, the racks 20 include junction plates 32 that project transversely outward from the vertical end walls 24. The junction plates 32 are configured for interconnecting the two racks 20 together. For example, intermediate plates 34 can be bolted between the junction plates 32 to provide a mechanical connection. It is noted that the racks 20 are placed directly adjacent to one another with no fillers being positioned between the racks 20.

A vertical channel 36 is preferably positioned between the two racks 20. The vertical channel 36 would typically be used to provide vertical management of input and output cables 38 connected to the cross-connect modules 30. Front access openings 88 are provided to facilitate accessing the input/output cables 38 within the channel 36. To maximize the size of the vertical channel 36, each bay 26 preferably has a width $W_1$ that is relatively small as compared to a total width $W_2$ of each rack 20. For example, in certain embodiments, the width $W_1$ of each bay 26 is about 368 mm, and the width $W_2$ of each rack 20 is about 600 mm. It is preferred for the width $W_1$ of each bay 26 to be less than 400 mm.

Figure 2:
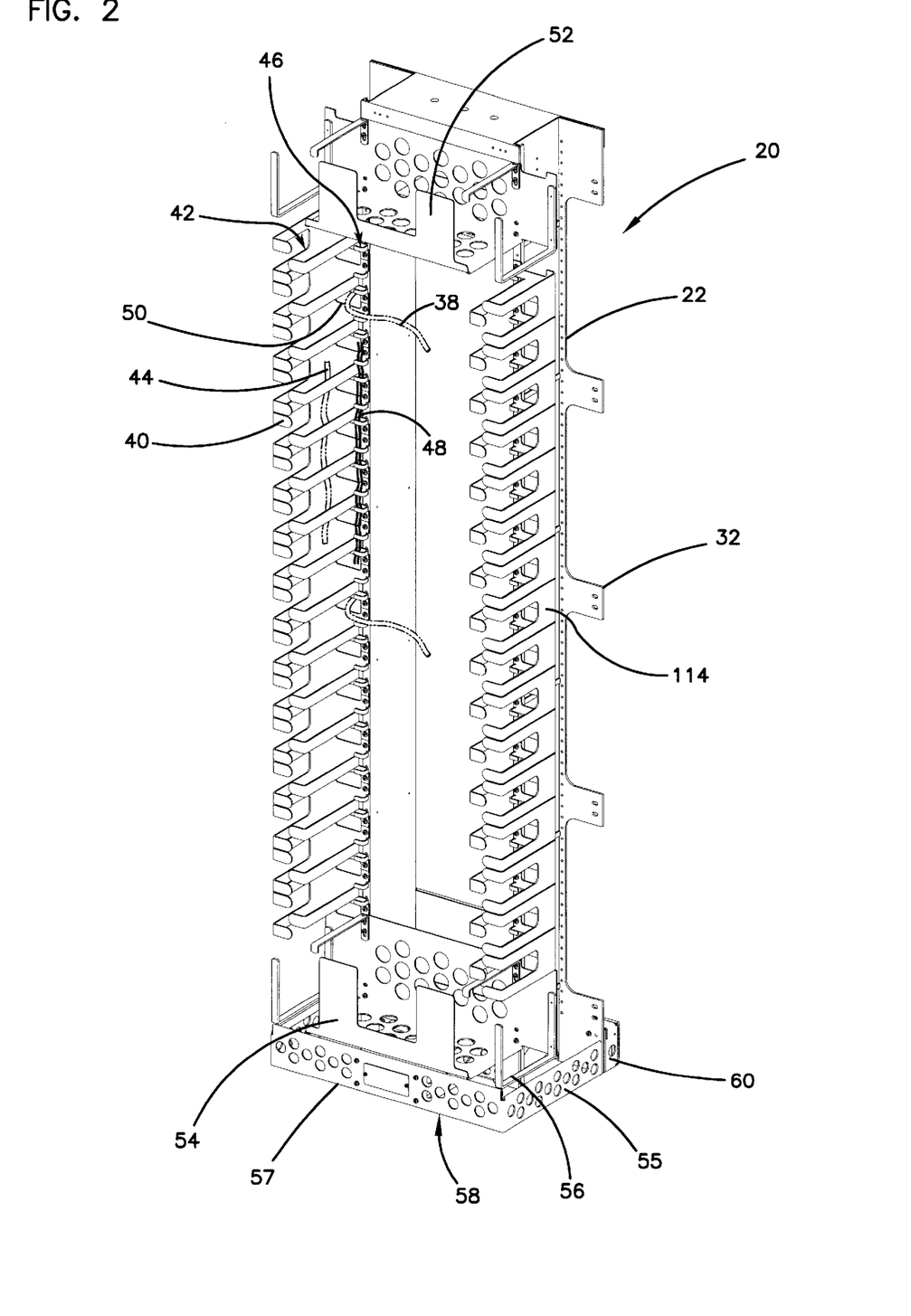
FIG. 2 is a rear perspective view of one of the racks of FIG. 1.

FIG. 2 is a rear perspective view of one of the racks 20. For clarity and ease of description, the chassis 28 and cross-connect modules 30 have been removed from FIG. 2.

The rack 20 includes two columns of ring structures 40. Each column of ring structures 40 defines a first vertical channel 42 sized for receiving cross-connect cables 44 from the cross-connect modules, and a second vertical channel 46 sized for receiving power and ground wires 48 (e.g., 45 volt). By separating the cross-connect cables 44 from the power and ground wires 48, concerns about cross-talk between the wires and cables can be reduced.

Openings 50 are defined between adjacent ring structures 40 in each column. The openings 50 are configured for allowing the input/output cables 38 to be fed from the vertical channels 36 (shown in FIG. 1) to the backside of the rack 20 where electrical connections can be made with the input and output contact locations of the modules 30. It will be appreciated that the input/output cables 38, the cross-connect cables 44 and the power and ground wires 48 have been shown schematically.

Referring still to FIG. 2, the rack 20 includes upper and lower troughs 52 and 54 for supporting cross-connect cables that are fed across the back of the rack 20. The cross-connect cables are fed between racks to provide cross-connections between modules of different racks. Support brackets 56 are used to support cross-connect wires that extend between two adjacent racks. The channels 42 defined by the ring structures 40 provided for vertical cable management of the cross-connect cables.

A cable guard assembly 58 is positioned below the lower trough 54 at the base of the rack 20 (e.g., at floor level). The cable guard assembly 58 includes a guard box 60 positioned at the front of the rack 20, end guard members 54 that cover the ends of rack 20, and a rear guard member 56 that covers the back of the rack 20. Holes are provided in various components of the guard assembly 58 to reduce weight and cost.

Figure 3:
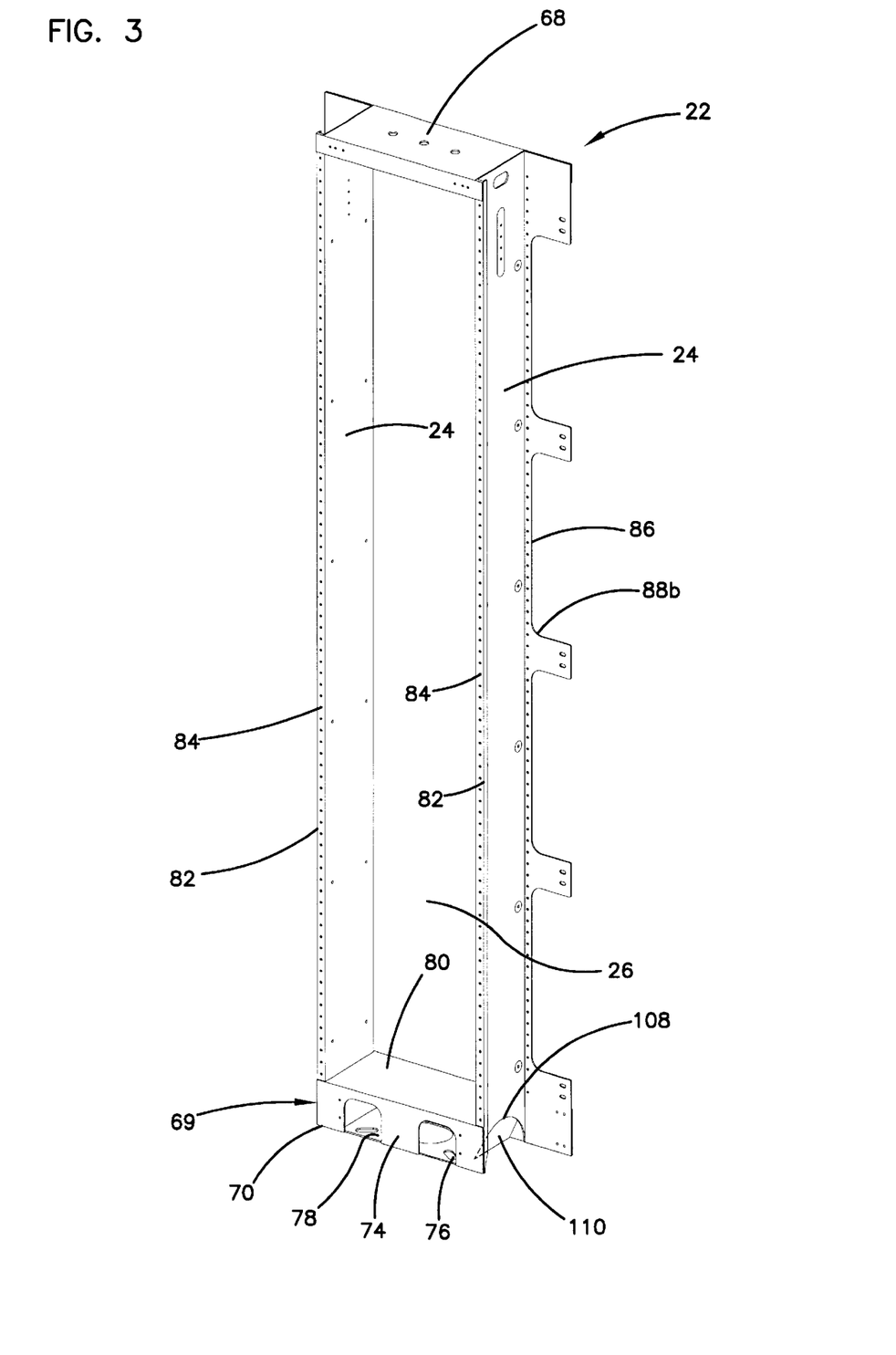
FIG. 3 is a rear perspective view of a frame used by the rack of FIG. 2.
Figure 4:
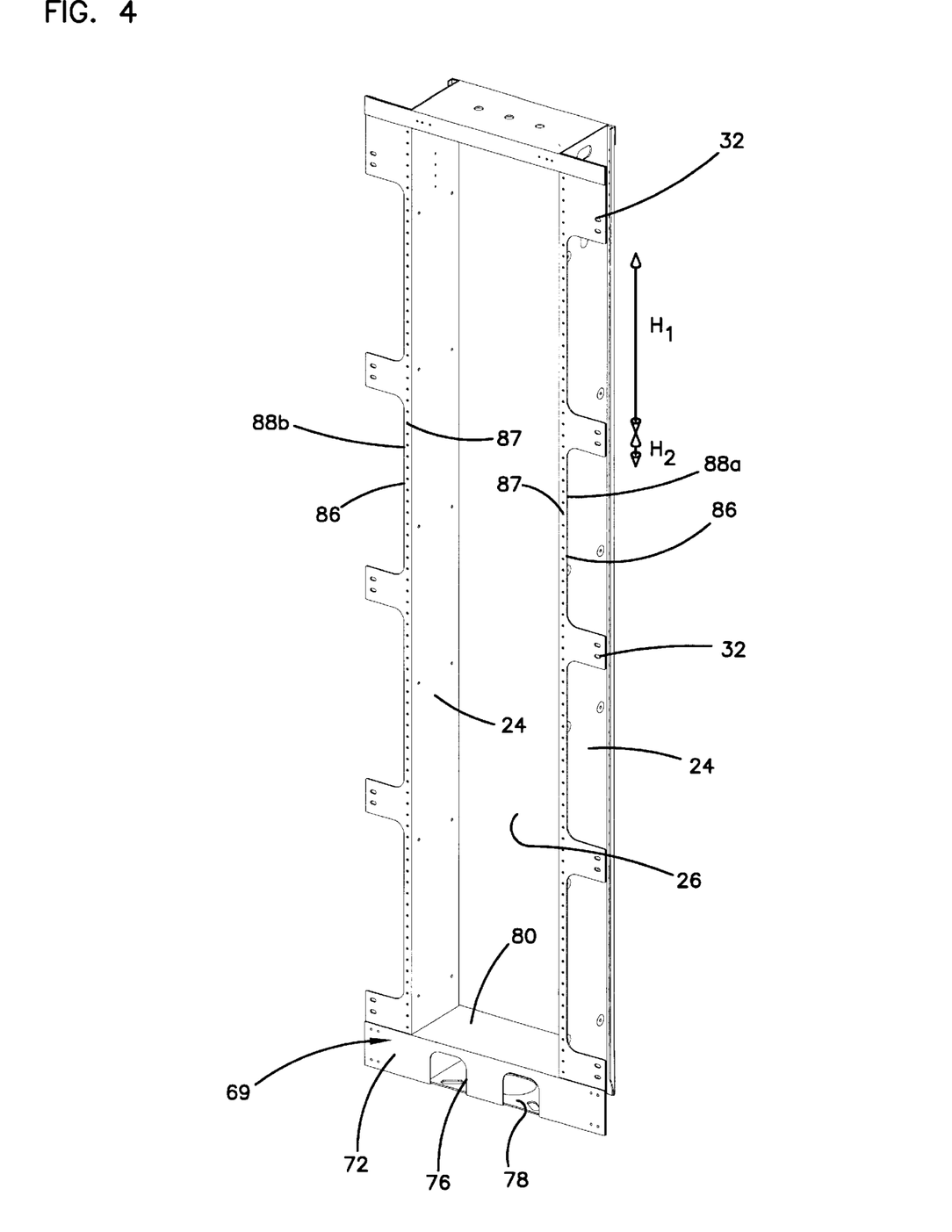
FIG. 4 is a front perspective view of the frame of FIG. 3.

Referring to FIGS. 3 and 4, the frame 22 of the racks 20 is shown in isolation. The frame 22 includes a top end 68 positioned opposite from a base end 70. A base box 69 is formed adjacent the base end 70. The base box 69 includes opposing front and back walls 72 and 74. The front and back walls 72 and 74 define openings 76 for accessing the interior of the base box 69. The base box 69 also includes a base plate 78 adapted to be positioned at floor level, and a horizontal wall 80 positioned above the base plate 78. The horizontal wall 80 defines the bottom of the bay 26.

Referring to FIG. 3, the frame 22 includes rear lips 82 that project transversely outward from the vertical end walls 24 adjacent the backside of the frame 22. The rear lips 82 define a plurality of openings 84 for use in bolting or otherwise connecting the ring structures 40 to the backside of the frame 22. Similar front lips 86 project transversely outward from the vertical end walls 24 adjacent the front of the frame 22. The front lips 86 define openings 87 for allowing the chassis 28 to be bolted or otherwise connected to the frame 22.

The junction plates 32 of the rack 20 are integral with the front lips 86. Slots or cut-out portions 88a and 88b are formed between the junction plates 32. The cut-out portions 88a and 88b are configured for allowing front access to the input/output cables 38 positioned within the vertical channel 36 formed between the racks 20. For example, as shown in FIG. 1, the cut-out portions 88a and 88b cooperate to define the front access openings 88. It is preferred for the cut-out portions 88 to each have a height $H_1$ that is longer than a corresponding height $H_2$ of the junction plates 32. In certain embodiments, the heights $H_1$ of the cut-out portions 88 are at least two or three times as large as the heights $H_2$ of the junction plates 32.

Figure 5:
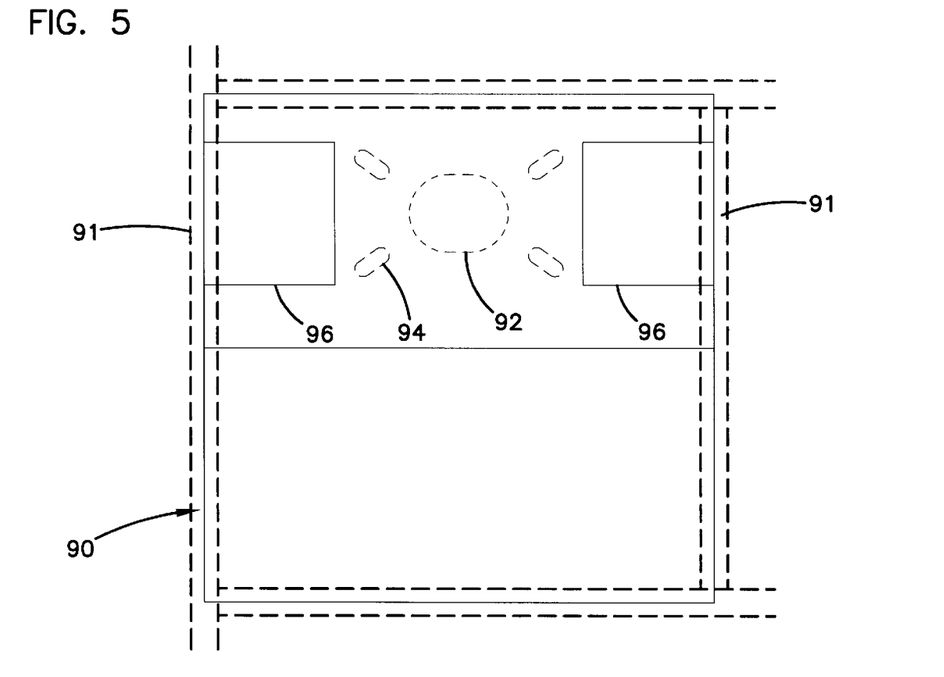
FIG. 5 is a cut-out detail for a raised floor adapted for supporting the rack of FIG. 2.

FIG. 5 shows one of a plurality of floor tile 90 suitable for supporting the rack 20. The floor tile 90 is preferably raised above a main floor such that cables (e.g., A/C power cables and input/output cables) can be passed beneath the raised floor 90. In one particular embodiment, the floor tile 90 is 600 mm×600 mm and is supported by a support grid 91. A hole pattern is cut into one half of the tile 90. The hole pattern includes a central opening 92 through which an A/C power cable can be passed. The pattern also includes four slots 94 for use in bolting one of the racks 20 to the raised floor 90. The pattern further includes two rectangular cutouts 96 for passing input and output cables 38 through the raised floor 90 and into the vertical channels 36 defined between the racks 20. The cutouts are partially obstructed by the support grid 91.

Figure 6:
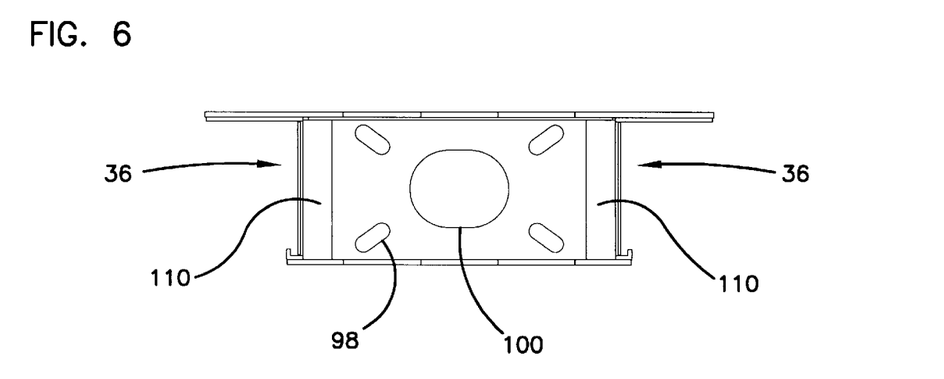
FIG. 6 is a floor mounting detail for the rack of FIG. 2.

FIG. 6 is a plan view of the base plate 78 of the frame 22. The base plate 78 defines four slots 98 adapted to align with the slots 94 cut through the raised floor 90. The base plate 78 also includes a central opening 100 adapted to align with the central opening 92 of the raised floor 90. The outwardly facing channels 36 of the frame 22 are adapted to align with the rectangular cutouts 96 in the raised floor 90. To connect the racks 20 to the floor, bolts are secured through the slots 94 and 98. To provide A/C power adjacent the rack 20, an A/C power cable can be fed through the central openings 92 and 100. Preferably, the A/C power cable is electrically connected to an outlet that can be mounted in one of the openings 76 defined by the front and back walls 72 and 74 of the frame box structure.

Figure 7:
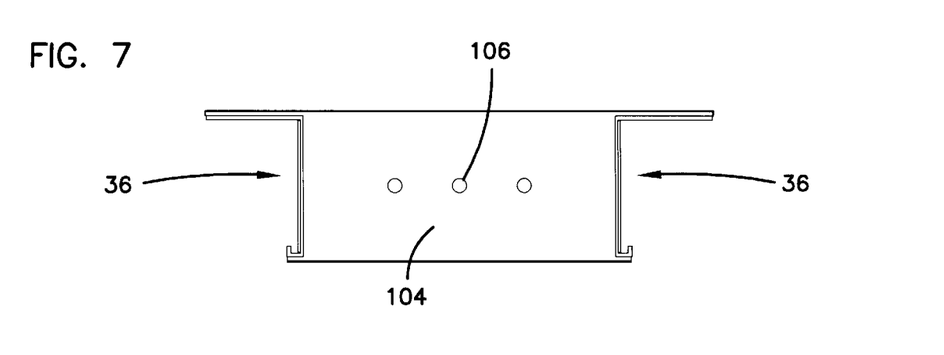
FIG. 7 is a top mounting detail for the rack of FIG. 2.

FIG. 7 shows a mounting detail for the top end 68 of the rack 20. The top end 68 includes a horizontal top plate 104 that defines the top of the bay 26. Three holes 106 are formed through the top plate 104. The holes 106 can be used to secure the top end 68 of the rack 20 to a ceiling or other structure through the use of attachment rods.

Referring back to FIG. 3, the right-most vertical end wall 24 defines a clearance opening 108 located at the base of the frame 22. The clearance opening 108 is configured for allowing input/output cables 38 (shown in FIG. 1) that extend along the right-most vertical wall 24 to pass directly beneath the bay 26 of the frame 22. In this manner, the clearance opening 108 provides clearance for allowing the input/output cables 38 to curve around or otherwise bypass an obstruction (e.g., the support grid 91 of FIG. 5) that may partially block the rectangular cut-out 96 in the raised floor 90. Absent the clearance opening 108, the support grid 91 would reduce the capacity of the vertical channels 36.

An inclined plate 110 is positioned adjacent to the clearance opening 108. The inclined plate 10 extends from the base plate 78 to a location above the clearance opening 108. At least a portion of the inclined plate 110 is located directly beneath the bay 26. The inclined plate 110 functions to protect the cables passing through the clearance opening 108.

Figure 8:
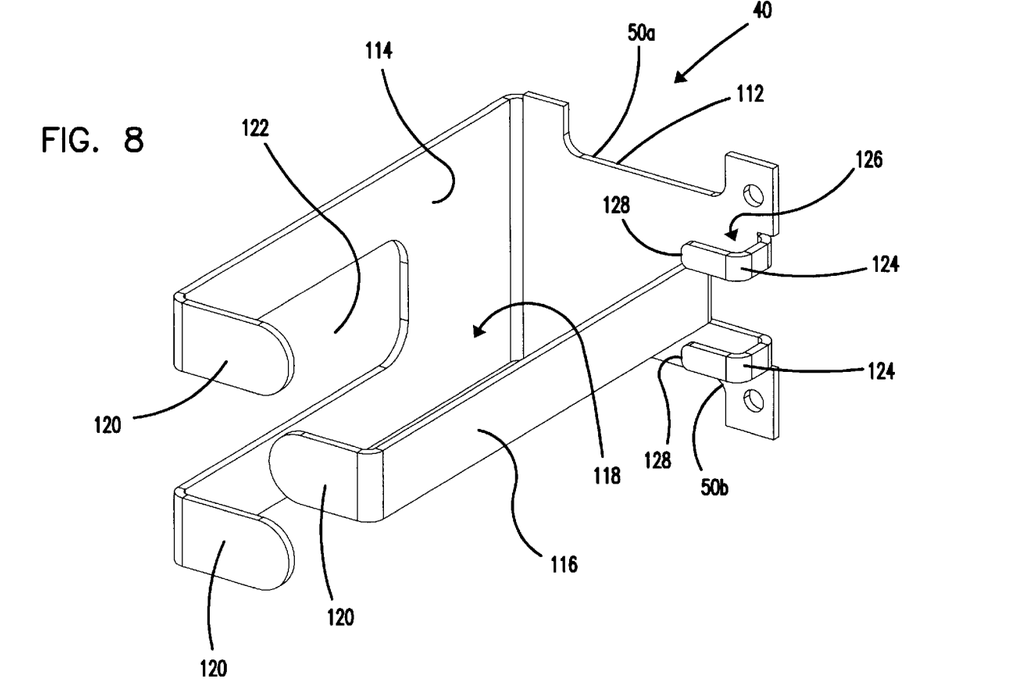
FIG. 8 is a perspective view of one of a plurality of ring structures mounted at the back of the rack of FIG. 2.
Figure 9:
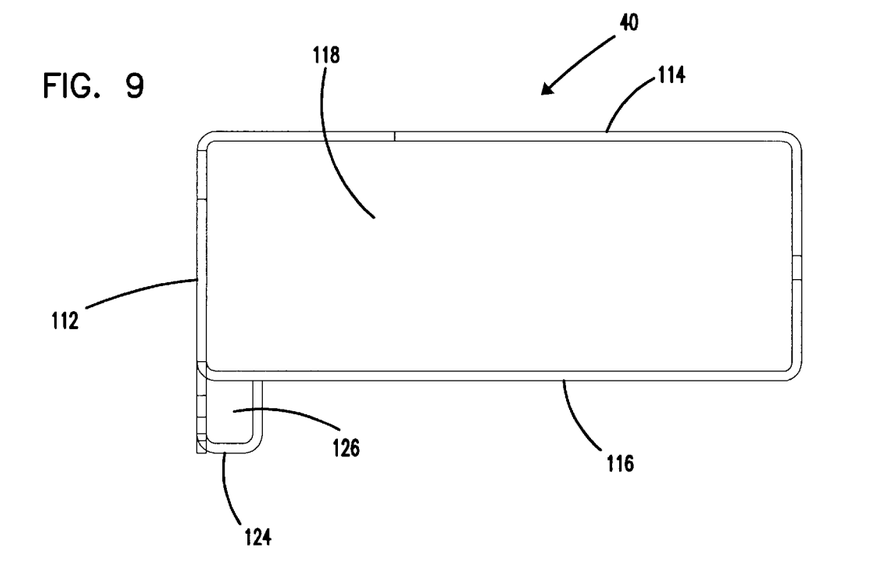
FIG. 9 is a top plan view of the ring structure of FIG. 8.

FIGS. 8 and 9 show one of the ring structures 40 in isolation from the rack 20. The ring structure 40 includes a base 112 adapted for connection to the rack 20 (e.g., bolt holes are provided through the base 112 for allowing the ring structure 40 to be bolted to the frame 22). The ring structure 40 also includes first and second opposing members 114 and 116 that project transversely outward from the base plate 112 and at least partially define a first opening 118 sized for receiving a plurality of cross-connect cables. The first and second opposing members 116 and 118 have bent ends 120 that extend toward one another and are generally parallel with respect to the base 112. A cut-away portion 122 is formed through the first opposing member 114 for allowing cross-connect cables to be fed into the first opening 118. The second opposing member 116 is in general alignment with the cut away portion 122.

The ring structure 40 also includes first and second vertically spaced-apart L-shaped members 124 that at least partially define a second opening 126 sized for receiving power and ground wires. The L-shaped members have free ends 128 that terminate adjacent the second opposing member 116. When a plurality of the ring structures 40 are mounted in a column along the frame 22, the first openings 118 are aligned along a first vertical axis to form the first vertical channel 36, and the second openings 126 are aligned along a second vertical axis to form the second vertical channel 46. As mounted on the frame 22, the outer surfaces of the first opposing members 114 align generally with the outermost edges of the junction plates 34. Consequently, when two racks 20 are interconnected as shown in FIG. 1, ring structures 40 corresponding to one of the racks 20 are placed in close proximity to ring structures 40 corresponding to the other of the racks 20 such that the ring structures 40 enclose the back of the channel 36 defined between the racks 20.

Referring to FIG. 8, the base 112 of the ring structure 40 defines upper and lower notches 50a and 50b. When mounted on the rack 20, as shown in FIG. 1, the upper and lower notches 50a and 50b of the ring structures 40 cooperate to define the access openings 50.

Referring to FIG. 9, the first opening 118 preferably has a cable passage area that is substantially larger than the cable passage area of the second opening 126. For example, as shown in FIG. 9, the first opening 118 has a cable passage area that is over 25 times as large as the cable passage area of the second opening 126.

Figure 10:
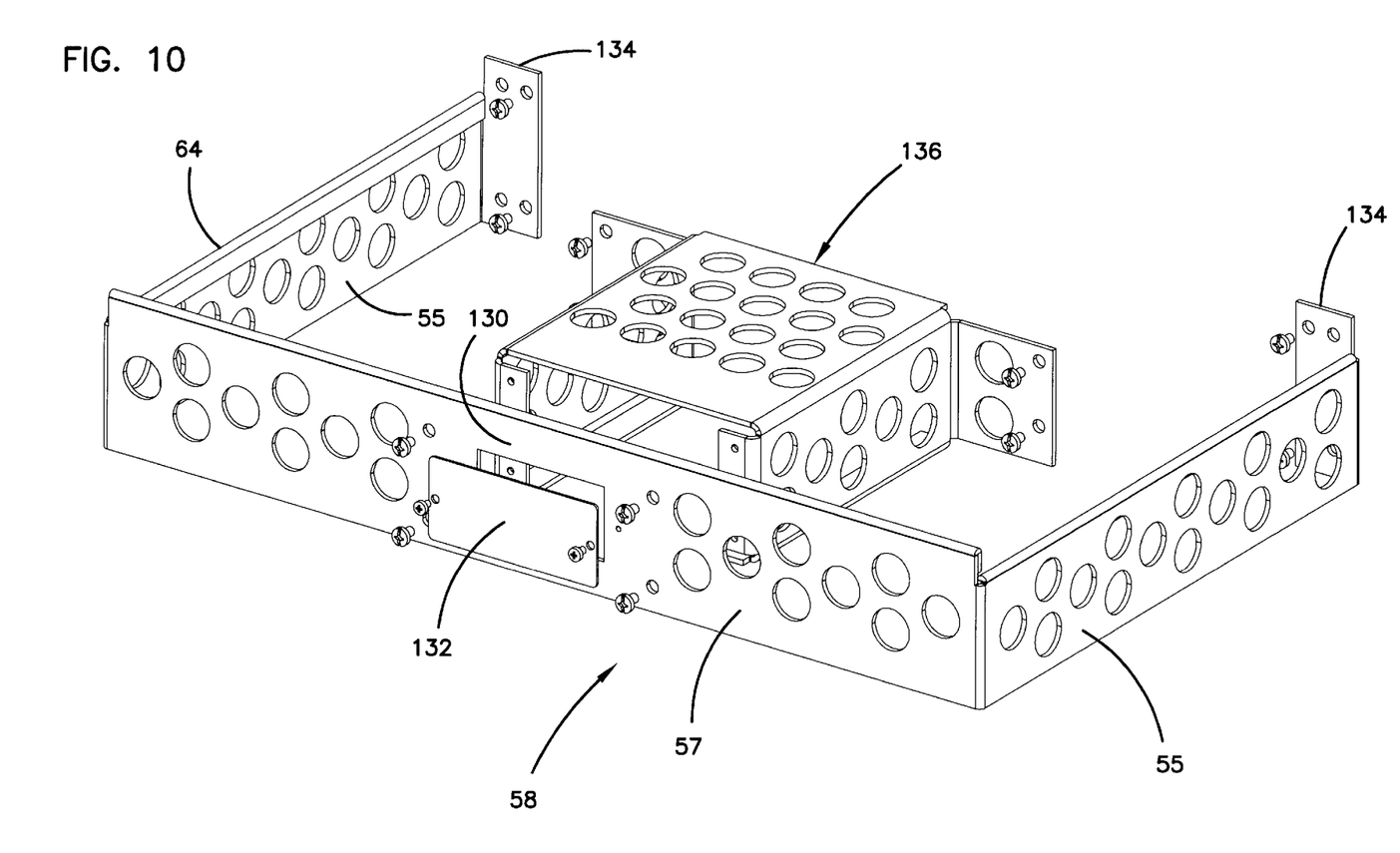
FIG. 10 is an exploded perspective view of a cable guard assembly adapted to be mounted at the base of the rack of FIG. 2.

FIG. 10 shows the rear and end guard members 57 and 55 (which are made as a single piece component) of the cable guard assembly 58 in isolation from the rack 20. As shown in FIG. 10, the rear guard member 57 defines an access opening 130 for allowing access to an A/C power outlet secured to the frame 22. When the access opening 130 is not in use, a removable cover plate 132 bolted to the rear guard 62 is used to close the opening 130.

The rear guard member 57 and the side guard members 55 are preferably connected to the frame 22 by conventional techniques such as bolts. For example, as shown in FIG. 10, the side guard members 55 include flanges 134 adapted to be bolted to the lower-most junction plates 32 of the frame 22.

Referring still to FIG. 10, the cable guard assembly 58 also includes an inner cable guard 136 that is preferably bolted to the back wall 72 of the base box 69. In certain embodiments, the inner cable guard 136 can be welded or otherwise fixedly connected to the frame 20 to provide additional structural support. The inner cable guard 136 forms a housing that encloses the openings 76 defined by the back wall 74 and functions to cover A/C outlets that can be mounted in the openings 76 or mounted elsewhere within the inner cable guard 136 (e.g., at the opening 130).

Figure 11:
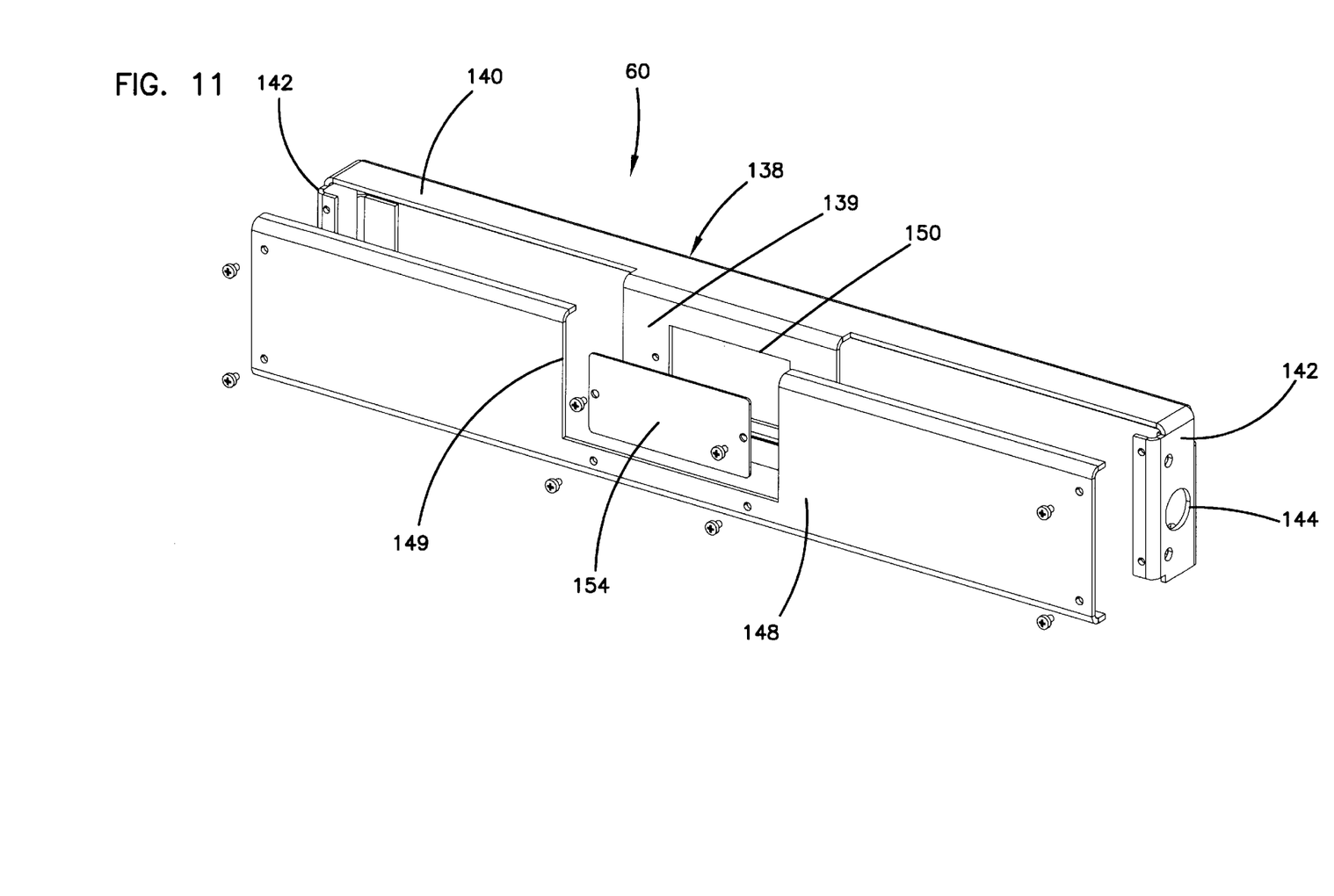
FIG. 11 is an exploded perspective view of a guard box adapted to be mounted at the front of the rack of FIG. 2.

FIG. 11 shows the guard box 60 in isolation from the frame 22. The guard box 60 includes a main housing 138 that is preferably bolted to the front wall 72 of the box structure 69. The main housing 138 includes a top wall 140 and two spaced-apart end walls 142. In certain embodiments, the top wall 140 can be welded or otherwise fixedly connected to the frame 20 to provide additional frame support. The end walls 142 define cable openings 144 for allowing an A/C power cable to be fed between adjacent racks 20. A back side of the main housing 138 is substantially open. A front side of the main housing 138 includes a central face plate 139 that extends downward from the top wall 140. The remainder of the front side of the main housing 138 is covered by a removable main face plate 148. The main face plate 148 includes a cut-out portion 149 for receiving the central face plate 139. The central face plate 139 defines a central opening 150 for providing access to an A/C outlet mounted within the box 60 (e.g., adjacent the central opening 150). A rectangular cover plate 154 is used to cover the access opening 150. The outlet cover 154 and the main cover 148 are preferably bolted to the main housing 138 so as to be removable. In this manner, the main face plate 148 can be removed without removing the outlet cover 154.

With regard to the foregoing description, it is to be understood that changes may be made in detail, especially in matters of the shape, size and arrangement of the parts without departing from the scope of the present invention. It is intended that the specification and depicted aspects be considered exemplary only, with a true scope and spirit of the invention being indicated by the broad meaning of the following claims.

I claim:

1. A rack for mounting telecommunication chassis each adapted for receiving cross-connect modules, the rack comprising:
   a frame defining a bay formed between two spaced-apart, vertical end walls, the bay being sized for receiving the telecommunication chassis; and
   a cable management structure connected to the frame, the cable management structure defining first and second separate vertical channels, the first vertical channel defining a first passage area sized for receiving a plurality of cross-connect cables from the telecommunication chassis, the second vertical channel defining a second passage area sized for receiving power and ground wires from the telecommunication chassis, the second passage area being substantially smaller than the first passage area.

2. The rack of claim 1, wherein the cable management structure includes a plurality of separate ring structures connected to the frame, each ring structure defining a first opening sized for receiving the plurality of cross-connect cables and a second opening sized for receiving the power and ground wires, the ring structures being mounted on the frame such that the first openings are aligned along a first vertical axis to form the first vertical channel, and the second openings are aligned along a second vertical axis to form the second vertical channel.

3. The rack of claim 2, wherein each ring structure includes: a base plate; first ring defining members that project outward from the base plate and at least partially define the first opening; second ring defining members that project outward from the base plate and at least partially define the second opening.

4. The rack of claim 3, wherein the first ring defining members include first and second opposing members having bent ends that extend toward one another, and wherein the second ring defining members include vertically spaced-apart L-shaped members.

5. The rack of claim 4, wherein the second opposing member is located between the first opposing member and the L-shaped members, and the L-shaped members have free ends that terminate adjacent the second opposing member.

6. The rack of claim 5, wherein the first opposing member defines a first cut-away region for providing cable access to the first opening, the cut-away region being in general alignment with the second opposing member.

7. The rack of claim 6, wherein the base plate defines at least one notch for passing input and output cables through the base plate.

8. A cable management ring structure for use with telecommunications equipment, the ring structure comprising:
   a base adapted for connection to a telecommunication cross-connect rack;
   a first ring that project outward from the base plate and at least partially defines a first opening sized for receiving a plurality of cross-connect cables;
   a second ring that projects outward from the base plate and at least partially defines a second opening sized for receiving power and ground wires, the second opening being separate from the first opening.

9. The ring structure of claim 8, wherein the first ring includes first and second opposing members having bent ends that extend toward one another, and wherein the second ring includes vertically spaced-apart L-shaped members.

10. The ring structure of claim 9, wherein the second opposing member is located between the first opposing member and the L-shaped members, and the L-shaped members have free ends that terminate adjacent the second opposing member.

11. The ring structure of claim 10, wherein the first opposing member defines a first cut-away region for providing cable access to the first opening, the cut-away region being in general alignment with the second opposing member.

12. The ring structure of claim 11, wherein the base plate defines at least one notch for passing cables through the base plate.

13. A method for managing cables in a telecommunication cross-connect system comprising:
   placing cross-connect cables through a first channel defined by a first plurality of rings; and
   placing power and ground wires through a second channel defined by a second plurality of rings, wherein the first channel is separate from the second channel such that the cross-connect cables are separated from the power and ground wires.

14. A rack for mounting telecommunication chassis each adapted for receiving cross-connect modules, the rack comprising:
   a frame including a front and a back;
   the frame defining a bay formed between two spaced-apart, vertical end walls, the bay being sized for receiving the telecommunication chassis;
   a plurality of rings mounted at the back of the frame for receiving cross-connect cables from the cross-connect modules;
   a plurality of vertically spaced-apart junction plates projecting transversely outward from the vertical end walls adjacent the front of the frame, the junction plates being arranged and configured for connecting the frame to an adjacent frame; and
   the frame defining a plurality of slot regions positioned between the vertically spaced-apart junction plates, the slot regions being sized for allowing front access to input/output cables positioned between the frame and the adjacent frame.

15. The rack of claim 14, wherein the rings include portions that oppose the junction plates such that a vertical channel for receiving the input/output cables is formed between the rings and the junction plates.

16. The rack of claim 15, wherein the rings define access openings for allowing the input cables to be fed from the vertical channel to the back of the frame.

17. A rack for mounting telecommunication chassis each adapted for receiving cross-connect modules, the rack being adapted for use with a system having a raised floor with cut-out power cable openings for passing power cables through the floor and cut-out input/output openings for passing input/output cables through the floor, the rack comprising:
- a frame including a top and a base, the base including a base plate defining a power cable opening adapted to align with one of the cut-out power cable openings of the raised floor;
- the frame defining a bay formed between two spaced-apart, vertical end walls, the bay being sized for receiving the telecommunication chassis;
- outwardly facing channels that extend along the vertical end walls, the outwardly facing channels being arranged and configured for receiving the input/output cables such that the input/output cables extend along the vertical end walls, and the outwardly facing channels being adapted to generally align with the cut-out input/output openings of the raised floor; and
- at least one of the vertical end walls defining a cable clearance opening located at the base of the frame for allowing the input/output cables extending along the at least one vertical end wall to pass directly beneath the bay of the frame, wherein the clearance opening provides clearance for allowing the input/output cables to curve around an obstruction partially blocking the cut-out input/output opening in the floor.

18. The rack of claim 17, further comprising an inclined plate extending from the base plate at a location beneath the bay to a top of the clearance opening.

19. The rack of claim 17, further comprising a cable guard positioned adjacent the base of the frame, the cable guard a rear cable guard member extending along a rear of the frame, and end cable guard members extending across the outwardly facing channels.

20. The rack of claim 19, further comprising an inner cable guard positioned inside the rear cable guard member and the end cable guard members, the inner cable guard member being adapted for covering a power outlet.

21. The rack of claim 20, wherein the rear cable guard member defines an access opening for allowing access to the power outlet positioned within the inner cable guard, and wherein the access opening is covered by a removable plate.

22. The rack of claim 17, further comprising a guard box mounted at the base of the frame, the guard box including first and second separate removable face plates, the first face plate covering a majority of a front face of the guard box, and the second face plate covering an outlet access opening.

23. A rack system for mounting telecommunication chassis each adapted for receiving cross-connect modules, the rack system comprising:
- first and second racks each including:
  - a frame including a front and a back, the frame defining a bay formed between two spaced-apart, vertical end walls, the bay being sized for receiving the telecommunication chassis;
  - a plurality of rings mounted at the back of the frame for receiving cross-connect cables from the cross-connect modules;
  - a plurality of vertically spaced-apart junction plates projecting transversely outward from the vertical end walls adjacent the front of the frame, the junction plates defining a plurality of slot regions positioned between the vertically spaced-apart junction plates the slot regions;
- the first and second racks being interconnected such that the junction plates of the first rack are directly adjacent to the junction plates of the second rack;
- the first and second racks defining a vertical channel therein between for receiving input/output cables;
- the rings of the first and second racks being arranged and configured to enclose a back side of the vertical channel; and
- the vertical channel having a front side enclosed by the junction plates of the first and second racks, wherein the slot regions of the first and second racks are configured to provide front access to the input/output cables within the vertical channel.

24. The rack system of claim 23, wherein the slot regions cooperate to define generally rectangular front access openings.

25. The rack system of claim 23, wherein the rings defined rear openings for feeding the input/output cables from the vertical channel to the rear of the frames.

26. A method for managing cables in a telecommunication cross-connect system comprising:
- providing a rack including a plurality of telecommunication chassis in a vertical stack, each chassis including a plurality of cross-connect modules including rear cross-connection locations and front access bores;
- routing a first plurality of input/output cables from beneath a floor supporting the rack through a first opening in the floor;
- further routing the first plurality of input/output cables vertically in a first cable pathway along one side of the rack to the plurality of rear cross-connection locations;
- routing a second plurality of input/output cables from beneath the floor through a second opening in the floor, the second opening being separate from the first opening;
- further routing the second plurality of input/output cables vertically in a second cable pathway along an opposite side of the rack to the plurality of rear cross-connection locations; and
- routing a plurality of cross-connect cables to cross-connect one or more of the modules to other modules.

27. The method of claim 26, wherein the rack includes a plurality of rings stacked vertically, the cross-connect cables positioned within the rings, wherein the rings define a cable pathway separate from the first and second cable pathway for the input/output cable.

28. The rack of claim 1, wherein the frame defines two front vertical cable channels, each front vertical cable channel defined in part by one of the vertical end walls, each front vertical cable channel further defined by a front wall portion of the frame, the front wall portion of the frame defining a plurality of vertically spaced-apart access openings to access the front vertical cable channels from front of the frame, each front vertical cable-channel further having an open side for forming an interconnected front vertical cable channel when the frame is mounted adjacent to a second frame constructed and arranged with a front vertical cable channel, and wherein the first vertical channel of the cable management structure includes a plurality of vertically space-apart access opening for allowing cables to be fed from the respective front vertical channels to the respective first vertical channel on each side of the frame.

29. A rack for mounting telecommunication chassis each adapted for receiving cross-connect modules, the rack comprising:

a frame including a front and a back;

the frame defining a bay formed between two spaced-apart, vertical end walls, the bay being sized for receiving the telecommunication chassis;

a plurality of rings mounted at the back of the frame for receiving cross-connect cables from the cross-connect modules;

a plurality of vertically spaced-apart junction plates projecting transversely outward from the vertical end walls adjacent the front of the frame, the plate portions being arranged and configured for being arranged and configured for being positioned adjacent to a second frame; and the frame defining a plurality of access openings positioned between the vertically vertically spaced-apart plate portions, then access openings being sized for allowing front access to input/output cables positioned between the frame and the adjacent frame.

30. The rack of claim 29, wherein the rings include portions that oppose the plates portions such that a vertical channel for receiving the input/output cables is formed between the rings and the plate portions.

31. The rack of claim 30, wherein the rings define access openings for allowing the input cables to be fed from the vertical channel to the back of the frame.

32. A rack for mounting telecommunication chassis each adapted for receiving cross-connect modules, the rack being adapted for use with a system having a raised floor with cut-out power cable openings for passing power cables through the floor and cut-out input/output openings for passing input/output cables through the floor, the rack comprising:

a frame including a top and a base, the base including a base plate defining a power cable opening adapted to align with one of the cut-out power cable openings of the raised floor;

the frame defining a bay formed between two spaced-apart, vertical end walls, the bay being sized for receiving the telecommunication chassis;

outwardly facing channels that extend along the vertical end walls, the outwardly facing channels being arranged and configured for receiving the input/output cables such that the input/output cables extend along the vertical end walls, and the outwardly facing channels being adapted to generally align with the cut-out input/output openings of the raised floor.

33. A rack system for mounting telecommunication chassis each adapted for receiving cross-connect modules, the rack system comprising:

first and second racks each including:

a frame including a front and a back, the frame defining a bay formed between two spaced-apart, vertical end walls, the bay being sized for receiving the telecommunication chassis;

a plurality of rings mounted at the back of the frame for receiving cross-connect cables from the cross-connect modules;

a front wall portion projecting transversely outward from each of the vertical end walls adjacent the front of the frame, the front wall portions each defining a plurality of vertically spaced-apart access openings;

the first and second racks being interconnected such that one of the front wall portions of the first rack is directly adjacent to the one of the front wall portions of the second rack;

the first and second racks defining a vertical channel therebetween for receiving input/output cables;

the rings of the first and second racks being arranged and configured to enclose a back side of the vertical channel; and the vertical channel having a front side enclosed by the adjacent front wall portions of the first and second racks, wherein the access openings of the first and second racks are configured to provide front access to the input/output cables within the vertical channel.

34. The rack system of claim 33, wherein the access openings comprise open sided slots that cooperate to define generally rectangular front access openings.

35. The rack system of claim 33, wherein the rings define rear openings for feeding the input/output cables from the vertical channel to the rear of the frames.

* * * * *

UNITED STATES PATENT AND TRADEMARK OFFICE
CERTIFICATE OF CORRECTION

PATENT NO. : 6,102,214
DATED : August 15, 2000
INVENTOR(S) : Mendoza

It is certified that error appears in the above-identified patent and that said Letters Patent is hereby corrected as shown below:

Title page,
Item [56] References Cited, U.S. PATENT DOCUMENTS add:

| -- 5,220,600 | 06/1993 | Chouanard et al. |
| RE 34,955 | 05/1995 | Anton et al. |
| 5,497,444 | 03/1996 | Wheeler |
| 5,758,003 | 05/1998 | Wheeler et al. -- |

Item [56], after U.S. PATENT DOCUMENTS add:
-- FOREIGN PATENT DOCUMENTS
WO 98/35175   08/1998   (WO) --

Item [56], after FOREIGN PATENT DOCUMENTS add:
-- OTHER DOCUMENTS
"Digital Distribution Frame Products", Brochure by ADC Telecommunications, Inc. of Minneapolis, Minnesota, pp. 1-15 (March 1992)

"Digital Signal Cross-Connect (DSX-3) Front and Rear Cross-Connect Products", Brochure by ADC Telecommunications, Inc. of Minneapolis, Minnesota, pp. 1-71 (February 1999)

"DSX-1 Digital Signal Cross-Connect Modules, Panels and Accessories. Sixth Edition", Brochure by ADC Telecommunications, Inc. of Minneapolis, Minnesota, pp. 1-81 (May 1998)

"DSX-1 Digital Signal Cross-Connect Rack Framework and Accessories. Sixth Addition", Brochure by ADC Telecommunications, Inc. of Minneapolis, Minnesota, pp. 1-34 (July 1998)

"Fiber Cable Management Products. Second Edition", Brochure by ADC Telecommunications, Inc. of Minneapolis, Minnesota, pp. 1-144 (October 1995)

"FL2000 Products", Brochure by ADC Telecommunications, Inc. of Minneapolis, Minnesota, pp. 1-48 (November 1996)

"Mini DSX-3 Products", Brochure by ADC Telecommunications, Inc. of Minneapolis, Minnesota, pp. 1-35 (June 1997)

UNITED STATES PATENT AND TRADEMARK OFFICE
CERTIFICATE OF CORRECTION

PATENT NO. : 6,102,214
DATED : August 15, 2000
INVENTOR(S) : Mendoza

It is certified that error appears in the above-identified patent and that said Letters Patent is hereby corrected as shown below:

"Next Generation Frame (NGF) Product Family Ordering Guide", Brochure by ADC Telecommunications, Inc. of Minneapolis, Minnesota, pp. 1-21 (October 1998) --

<u>Column 11, claim 29,</u>
Line 19, "between the vertically vertically spaced-apart" should read -- between the vertically spaced-apart --

Signed and Sealed this

Second Day of April, 2002

Attest:

JAMES E. ROGAN
*Director of the United States Patent and Trademark Office*

*Attesting Officer*